Patented Nov. 7, 1933

1,934,032

UNITED STATES PATENT OFFICE 1,934,032

RESIN FROM PHENOLS AND AROYL-BENZOIC ACIDS

Herman Alexander Bruson, Germantown, Pa., assignor to The Resinous Products & Chemical Co. Inc., Philadelphia, Pa.

No Drawing. Application November 28, 1930
Serial No. 498,908

30 Claims. (Cl. 260—2)

This invention relates to new artificial resins derived from aromatic ketonic acids and phenols, as well as to further conversion products thereof which may be formed by reacting upon such condensation products with aldehydes.

The object of this invention is to produce artificial resins which are suitable for use in nitrocellulose lacquers, cellulose acetate lacquers, oil-varnishes, enamels and coating compositions in general; as well as for moulding and impregnating purposes, for electrical insulation, and the like.

I have found that if certain aromatic ketonic acids, of which for example, benzoyl-ortho-benzoic acid,

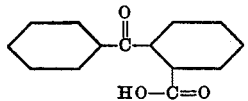

represents the simplest type; are treated with a phenolic body in the presence of a condensing agent such as concentrated sulphuric acid at a temperature below that at which esterification occurs, and below that at which formation of anthraquinone takes place, that resinous bodies are produced. These products form pale, amber-colored, brittle resins resembling colophony. These products may then be hardened by condensation with formaldehyde or with other aldehydic substance to form higher melting resins suitable for a wide variety of technical uses.

The ortho-aromatic ketonic acids which I employ possess the general formula

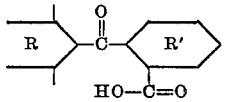

wherein

represents an aromatic hydrocarbon nucleus or its nuclear substituted alkyl-, aryl-, aralkyl-, alkoxy-, hydroxy-, hydrogenated, or halogenated derivative. It is understood that

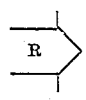

may represent a mononuclear hydrocarbon such as benzene and its nuclear derivatives of the above type, or that it may represent a polynuclear aromatic hydrocarbon such as naphthalene, diphenyl, anthracene, etc., and their substitution products of the above type. The benzene ring designated R' may be likewise substituted in the nucleus by alkyl-, aryl-, aralkyl-, alkoxy-, hydroxy-, nitro-, hydrogen, or halogen groups. Such acids are conveniently prepared by methods already known, involving for example, a condensation of phthalic anhydride or its nuclear substitution products, with an aromatic compound or its nuclear substitution products, and anhydrous aluminum chloride, boric acid, or other suitable catalyst. Typical acids which belong to the above class and which I employ chiefly because of their low cost are the following: benzoyl-o-benzoic, p-toluyl-o-benzoic, alpha-naphthoyl-o-benzoic, p-phenylbenzoyl-o-benzoic, alpha - hydroxy - naphthoyl-o-benzoic, 2', 5'-dichloro-2-benzoyl-benzoic, p-cymoyl-o-benzoic, methoxybenzoyl-o-benzoic, and hydroxy benzoyl-o-benzoic acids.

Any one of these typical acids may be condensed with a phenol in the presence of concentrated sulphuric acid at a low temperature to produce the herein described resins which can then be hardened by treatment with an aldehyde. It is understood that the term phenol as used herein refers to phenols which possess a free para-position available for condensation and includes phenol itself, alpha- or beta-naphthol, ortho- or meta-cresol, xylenol, o-chloro-phenol, sec-amyl phenol and the like, as well as phenolic ethers.

The products obtained by treating a suitable mixture of the above acid and phenolic components with concentrated sulphuric acid at a low temperature are in some cases crystalline but when melted form hard resinous masses which crystallize only with great difficulty upon cooling. They do not dissolve in cold dilute sodium bicarbonate solution whereas the acids from which they are made dissolve freely therein; this shows that the product is not a simple mixture of organic acid and phenol but a chemical combination which is probably lactonic in nature. These resins melt at from 50° C. to about 100° C. depending upon the aromatic ketonic acid used and upon the phenol employed. I have found that the higher melting varieties are produced from p-phenyl-benzoyl-o-benzoic acid and naphthols whereas the lower melting varieties are obtained from benzoyl-o-benzoic acid and phenol.

The above resins readily undergo condensation with formaldehyde, furfural, acetaldehyde or with other aldehydes or aldehyde-producing substances, especially in the presence of ammonia, hexamethylene tetramine, caustic alkalies, mineral acids and similar catalysts, such as are ordinarily used in condensing phenol-aldehyde resins. The products obtained in this way may be of the fusible, soluble form or they may be carried to an insoluble, difficultly fusible stage.

In the soluble form, these resins are readily compatible with nitro-cellulose or cellulose acetate lacquers, and when used in conjunction therewith give clear, hard, adherent, films of good durability.

The resins may be dissolved in hot oils such as linseed oil, tung oil, and the like and used as varnishes. Or they may be heated with rosin or other natural acidic gums with or without the addition of glycerol or other alcohol to obtain compositions useful in varnishes.

In order to illustrate this invention the following examples are given:

Example 1

A mixture of ⅕ mole benzoyl-o-benzoic acid (45 grams) and 20.2 grams phenol (10 per cent excess over that theoretically required for a 1:1 molal ratio) are melted together at about 60° C. until a homogeneous liquid is obtained. This is cooled, and to the mixture at 20-25° C., 60 grams of concentrated 95% sulphuric acid are run in slowly with constant stirring. The mixture tends to heat up, but should be cooled with running water so that the reaction temperature does not rise above 50° C. When all the acid has been added, the mixture is stirred ten minutes longer. A deep red liquid is obtained. This is poured into about a liter of water whereupon a pale waxy resin separates out. It may be washed several times by decantation and by kneading under warm water to remove sulphuric acid and free phenol. The mass is then steam distilled to volatilize any traces of uncombined phenol. A white crumbly mass is obtained which may be dried at 110° C. It then forms a pale, amber-colored hard resin which resembles colophony. The yield is about 60 grams of resin, so that the conversion is practically quantitative. The product does not dissolve in a cold 10 percent aqueous solution of sodium bicarbonate but does dissolve in caustic soda solution. It melted at 55-70° C. and is soluble in acetone, ethyl alcohol, butyl alcohol, glycol monoethyl ether, and butyl acetate, but is only partially soluble in toluol.

Instead of using benzoyl-o-benzoic acid; an equivalent weight of p-toluyl-o-benzoic acid, alpha-naphthoyl-o-benzoic acid, alpha-hydroxy-naphthoyl-o-benzoic acid, and other acids of the same general type as described above, may be used. The phenol may be in whole or in part replaced by alpha-naphthol, beta-naphthol, o-cresol, and other phenolic bodies having a free para position.

The sulphuric acid used may be weaker if desired, but the reaction takes place more slowly and less completely if the acid is appreciably less than 90% H₂SO₄.

When the above resins are mixed with an equal weight of dry nitrocellulose and the mixture is dissolved in a solution of butyl acetate-toluol (1:1 parts by weight) so as to form a lacquer containing 20% solids, a clear solution is obtained which dries to a hard, transparent, adherent film suitable for coating wood, metal, glass and other surfaces.

Example 2

15 grams of the resin obtained in Example 1 from phenol and benzoyl-o-benzoic acid, were mixed with 1.5 grams of para-formaldehyde and 0.10 gram hexamethylene tetramine. The mixture was gently fused at 100-110° C. whereupon a vigorous reaction set in. After about 10 minutes heating at 110° C., a pale-amber, brittle resin having a melting point of 90° C. was obtained. The product was also compatible with nitro-cellulose or cellulose acetate lacquers.

If the quantity of para-formaldehyde is doubled, a product having a higher melting point is obtained, which upon further heating with 0.1 gram hexamethylene-tetramine forms an insoluble difficultly fusible resin.

Instead of para-formaldehyde, one may use aqueous, commercial formaldehyde solution. Other aldehydes such as furfural, acetaldehyde, and the like may be used also.

Example 3

The acid obtained from the condensation of phthalic anhydride and alpha-naphthol by means of boric acid, and consisting essentially of hydroxy-naphthoyl-o-benzoic acid is thoroughly mixed with ⅖ its weight of phenol and twice its weight of 95% sulphuric acid at a temperature below 40° C. The mass is worked up as described in Example 1 and steam distilled to remove excess phenol. The resinous mass obtained forms a hard, amber-like, brittle material when dried at 110° C.

This substance may be dissolved in organic solvents and used as a coating composition or it may be condensed further with aldehydes if desired. For instance, 372 parts of the resin and 165 parts by weight of aqueous 37% formalin are heated together under reflux in the presence of 10 parts by weight of concentrated hydrochloric acid. The heating is continued for several hours and the resin formed is run off and dried.

It will be seen from the above description that a wide range of ortho-aromatic ketonic acids and phenols may be used for the first part of the reaction, and that any excess of phenolic body is removed by steam distillation, so that the second part of the reaction is not a simple aldehyde-phenol type of condensation but involves the condensation of what appear to be lactone-type compounds with aldehydes. Whatever the theory of this reaction may be, the results obtained are novel, and new high melting technically valuable resins are obtained which are particularly adaptable for cellulosic lacquers, and as starting materials for other resins.

Having described my invention and given several examples by which it may be carried out, I hereby claim:

1. A composition of matter comprising the resinous reaction product of phenol, p-toluyl-ortho-benzoic acid, and formaldehyde.

2. A resinous condensation product of a phenol and a ketonic, monobasic acid of the general formula

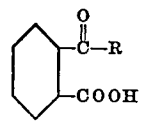

where R represents an aromatic nucleus not containing a carboxyl group, said condensation product being substantially free of esterified phenol.

3. The step in the process of preparing a synthetic resin which comprises heating a product described in claim 2, with an alydehyde, in the presence of acid condensing agent.

4. The step in the process of preparing a synthetic resin which comprises heating a product described in claim 2, with formaldehyde in the presence of hexamethylene tetramine.

5. A resinous condensation product of a phenol and an acid of the series consisting of benzoyl-ortho-benzoic acid and its homologues said condensation product being substantially free of esterified phenol.

6. A resinous condensation product of a phenol, a ketonic monobasic acid of the general formula

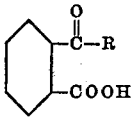

where R represents an aromatic nucleus not containing a carboxyl group, an aldehyde and a member of a group consisting of ammonia and hexamethylene tetramine.

7. A resinous condensation product of a phenol, an acid of the series consisting of benzoyl-ortho benzoic acid and its homologues, an aldehyde and a member of a group consisting of ammonia and hexamethylene tetramine.

8. A resinous condensation product of a phenol, an acid described in claim 6, formaldehyde and hexamethylene tetramine.

9. A resinous condensation product of a phenol, an acid of the series consisting of benzoyl-ortho-benzoic acid and its homologues, formaldehyde and hexamethylene tetramine.

10. A resinous condensation product of a phenol, a ketonic monobasic acid of the formula given in claim 6 and formaldehyde.

11. A resinous condensation product of a phenol, an acid of the series consisting of benzoyl-ortho-benzoic acid and its homologues, and formaldehyde.

12. A resinous condensation product of phenol, benzoyl-ortho-benzoic acid and formaldehyde said condensation product being substantially free of esterified phenol.

13. A resinous condensation product of phenol and benzol-ortho-benzoic acid said condensation product being substantially free of esterified phenol.

14. A resinous condensation product of phenol, naphthoyl-o-benzoic acid and formaldehyde said condensation product being substantially free of esterified phenol.

15. A resinous condensation product of phenol and naphthoyl-ortho-benzoic acid said condensation product being substantially free of esterified phenol.

16. A resinous condensation product of phenol and para-toluyl-ortho-benzoic acid said condensation product being substantially free of esterified phenol.

17. A process for preparing a resin which comprises condensing a phenol with an acid of the general formula

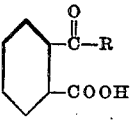

wherein R is a noncarboxylated aromatic nucleus, in the presence of concentrated sulphuric acid.

18. A process for preparing a resin which comprises further condensing the resin obtained in claim 17 with a substance capable of liberating formaldehyde upon the application of heat.

19. A resinous condensation product of a phenol, and ortho-aroyl-benzoic acid and formaldehyde.

20. The step in the process of preparing a resin which comprises heating a resinous condensation product of a phenol and an aroyl-ortho-benzoic acid, with a substance capable of liberating formaldehyde upon the application of heat; in the presence of a catalyst to promote the condensation.

21. A process for preparing a resin as set forth in claim 20 which comprises carrying out the condensation in the presence of ammonia.

22. The step in the process of preparing a resin which comprises heating a resinous condensation product of a phenol and an aroyl-ortho-benzoic acid with an aldehyde in the presence of a catalyst to promote the condensation.

23. The process as described in claim 20 in which the catalyst is an acid condensing agent.

24. The process as described in claim 20 in which the catalyst is an alkali condensing agent.

25. A resinous condensation product of formaldehyde with a preformed condensate of a phenol and a monobasic aroyl-ortho-benzoic acid, said preformed condensate being substantially free of esterified phenols.

26. A resinous condensation product of formaldehyde with a preformed condensate of a nuclear alkylated phenol and a monobasic aroyl-ortho-benzoic acid, said preformed condensate being substantially free of esterified alkylated phenol.

27. A resinous condensation product of formaldehyde with a preformed condensate of a phenol and a monobasic ketonic acid of the formula

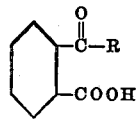

wherein R is one of the group consisting of a non-carboxylated aromatic nucleus and its alkyl-, aryl- aralkyl-, alkoxy-, hydroxy-, halogenated and hydrogenated derivatives; said preformed condensate being substantially free of esterified phenols.

28. A resinous condensation product of formaldehyde and a performed condenate of a phenol and an alkylbenzoyl-ortho-benzoic acid, said preformed condensate being substantially free of esterified phenols.

29. A process for making a resin which comprises condensing in the presence of concentrated sulphuric acid, a phenol having a free reactive nuclear position available for condensation, with a monobasic ketonic acid of the general formula

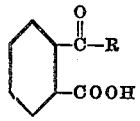

wherein R is an aromatic nucleus.

30. A process for making a resin which comprises condensing in the presence of concentrated sulphuric acid, a phenol having a free reactive nuclear position available for condensation, with a monobasic ketonic acid of the general formula

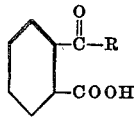

wherein R is an aromatic nucleus; and, after removing the sulphuric acid, treating such preformed condensate with formaldehyde and a catalyst capable of binding the formaldehyde with the condensate.

HERMAN ALEXANDER BRUSON.